(No Model.) 3 Sheets—Sheet 2.

C. T. LADD.
GUIDE FOR TACKLE OF GRAIN ELEVATORS.

No. 564,701. Patented July 28, 1896.

Witnesses:
Emil Neuhart.
F. Gustav Wilhelm.

C. T. Ladd Inventor.
By Wilhelm Bonner
Attorneys.

(No Model.) 3 Sheets—Sheet 3.
C. T. LADD.
GUIDE FOR TACKLE OF GRAIN ELEVATORS.
No. 564,701. Patented July 28, 1896.
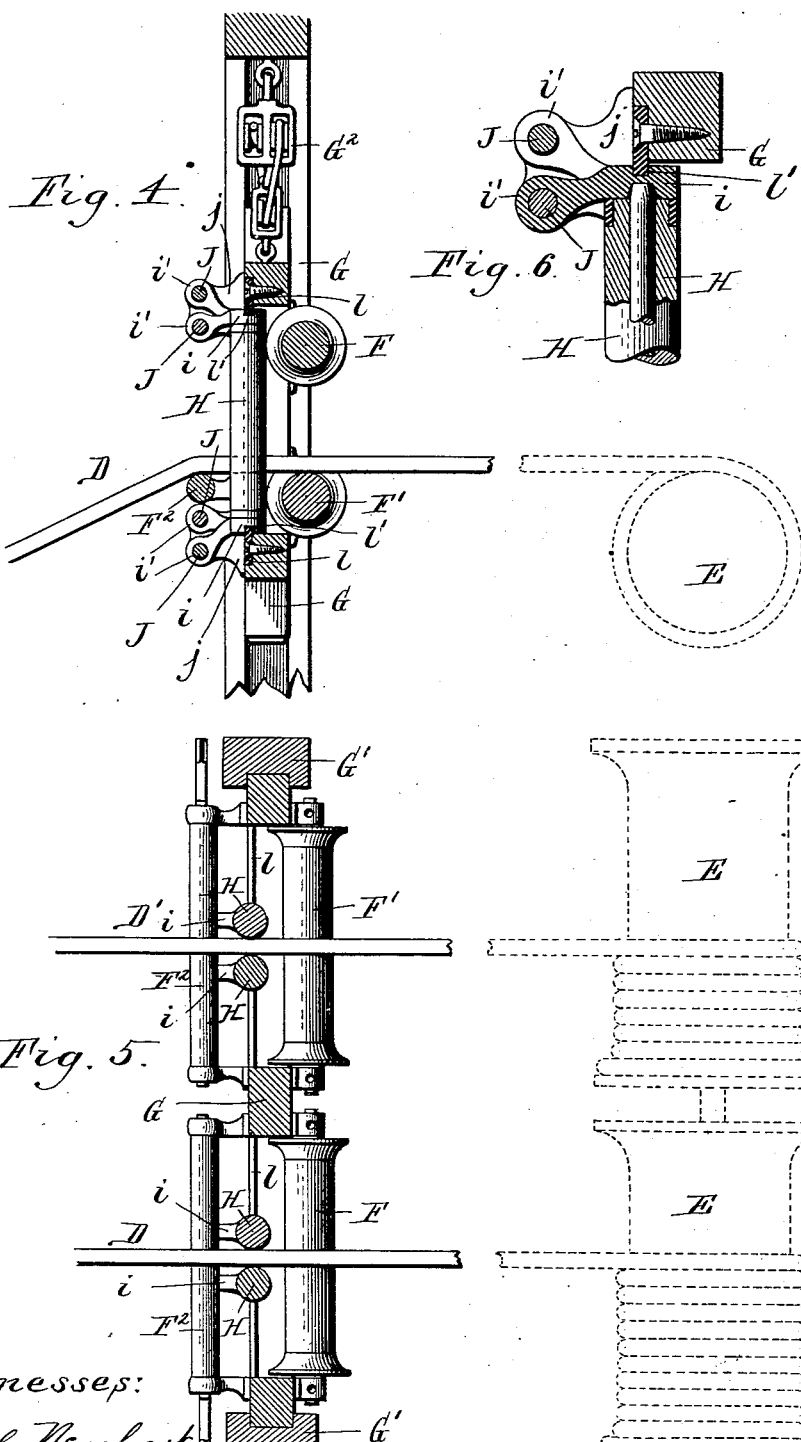

UNITED STATES PATENT OFFICE.

CARLTON T. LADD, OF BUFFALO, NEW YORK.

GUIDE FOR TACKLE OF GRAIN-ELEVATORS.

SPECIFICATION forming part of Letters Patent No. 564,701, dated July 28, 1896.

Application filed October 11, 1894. Serial No. 525,547. (No model.)

*To all whom it may concern:*

Be it known that I, CARLTON T. LADD, a citizen of the United States, residing at Buffalo, in the county of Erie and State of New York, have invented a new and useful Improvement in Guides for the Tackle of Grain-Elevators, of which the following is a specification.

This invention relates to the guide-rollers which are employed in connection with grain-elevators for guiding the ropes or cables whereby the scoops are actuated which travel back and forth in the hold of the vessel and deliver the grain to the elevator-leg.

The object of my invention is to make such guide-rollers laterally adjustable in a simple manner, so that the cables may be shifted or directed clear of posts or other obstructions and thus prevent the wear of the cables which occurs when they run in contact with such obstructions.

A further object of my invention is to render the guide-rollers readily removable from their supporting-frame, so that they can be replaced by new rollers when worn out.

Figure 1:
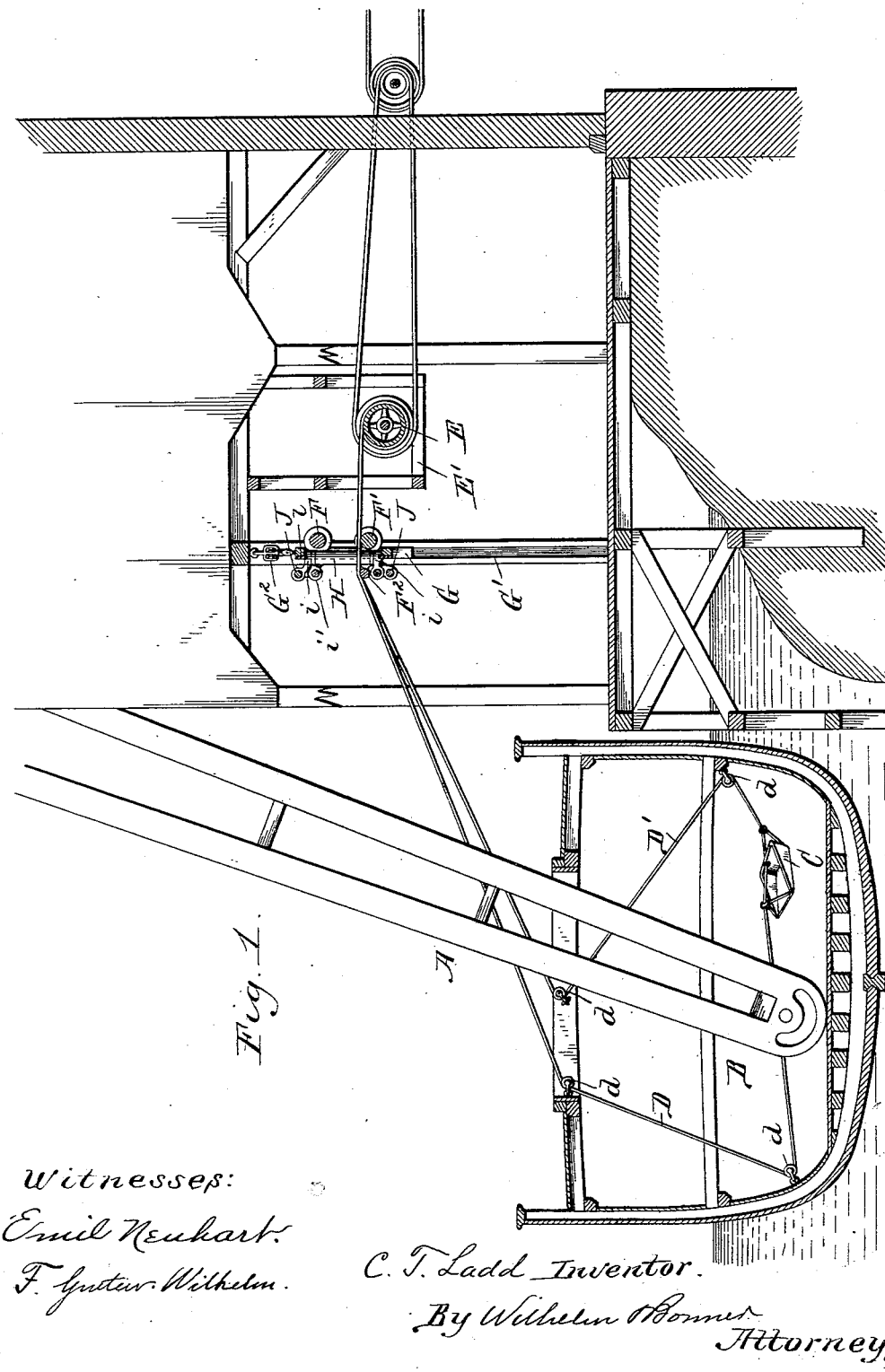
Figure 2:
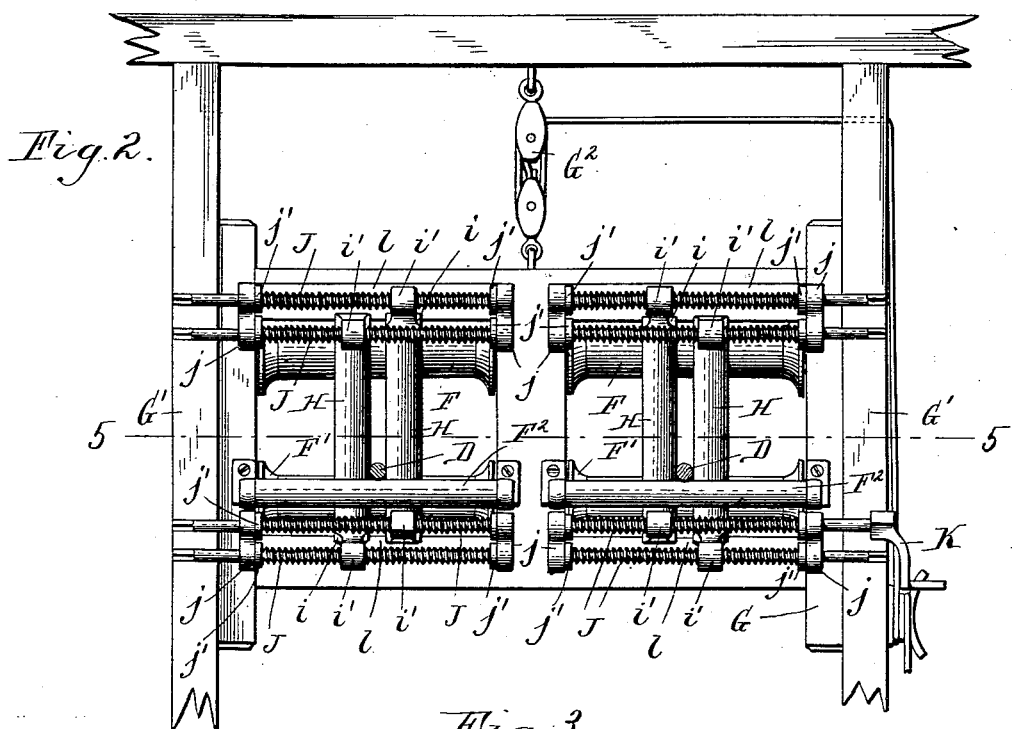
Figure 3:
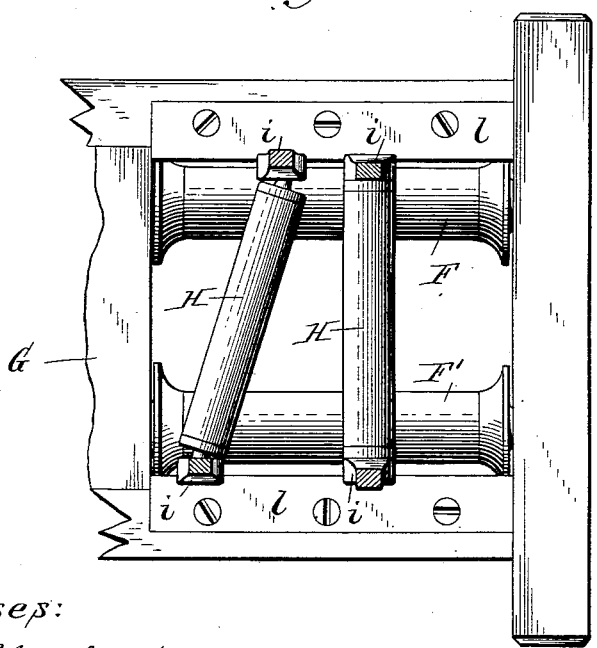

In the accompanying drawings, consisting of three sheets, Figure 1 is a sectional elevation of a grain-elevator and a vessel lying at the dock of the elevator, showing the application of my improvements. Fig. 2 is a front view of the guide-rollers and their supporting-frame on an enlarged scale. Fig. 3 is a fragmentary front view of the same on a still larger scale, showing one of the rollers tipped into the position in which it may be removed from its bearings. Fig. 4 is a fragmentary vertical cross-section of the guide-rollers and frame. Fig. 5 is a horizontal section thereof in line 5 5, Fig. 2. Fig. 6 is an enlarged sectional elevation of the upper portion of one of the vertical guide-rollers and its bearing.

Like letters of reference refer to like parts in the several figures.

A is the elevator-leg extending into the hold of the vessel B.

C is the scoop conveyer or shovel whereby the grain or other material in bulk is delivered to the elevator-leg, and D D' are the usual draft-cables connected with the scoop for drawing the same back and forth in the hold. These cables run over guide-pulleys $d$, arranged in the hold and the hatchway of the vessel and are connected with the customary drums E. The latter are supported in a frame E' and are provided with usual clutch mechanism for throwing them into and out of gear with the driving-shaft, so that one drum may be allowed to pay out its rope or cable while the other rope is wound upon its drum in a well-known manner.

F F' F² represent the usual horizontal rollers, which are arranged in front of the cable-drums and between which the cables pass. A set of such rollers is provided for each cable and the rollers F and F' are arranged one above the other, while the rollers F² are arranged in front of the lower rollers F' in the usual manner. These several rollers are journaled in an upright frame G, which is vertically adjustable between uprights G', having vertical grooves or ways in their inner faces in which the frame slides. This frame is raised and lowered and held in position by the usual tackle G².

All of the parts so far described are of common construction and form no part of my invention.

H represents the upright guide-rollers whereby the cables are confined against lateral movement on the horizontal rollers, and which are supported on the frame G and preferably arranged between the large rear rollers F F' and the small front rollers F², as shown in the drawings. The upright guide-rollers are made laterally movable in the supporting-frame G, so that the cables passing between them may be shifted sidewise in either direction for causing the cables to clear any obstruction on the dock or on the vessel against which they might otherwise run.

In the construction shown in the drawings, the rollers are journaled at their upper and lower ends in bearings $i$, having forwardly-projecting screw-nuts or internally-screw-threaded collars $i$, which traverse horizontal adjusting-screws J. These adjusting-screws turn with their end portions in bearings $j$, secured to the front sides of the supporting-frame G, and are held against lengthwise movement by collars $j'$, secured to the screws on the inner sides of their bearings, so that the rotation of the screws causes the nuts to traverse the same and move the bearings of the upright guide-rollers laterally accordingly. The outer ends of the adjusting-screws are made square or flat sided to receive a corresponding detachable wrench K, whereby they are turned. Two pairs of parallel adjusting-screws are employed for each pair of upright guide-rollers, as most clearly shown in Figs. 2 and 4, and the screw-nuts of one roller engage with the lower adjusting-screws of the two sets, while the nuts of the other roller engage with the upper adjusting-screws. The screws of each pair are arranged one above the other, so as to avoid interference of the screw-nuts of the rollers. The bearings of the upright rollers are laterally guided upon transverse rails or bars $l$, secured to the upper and lower cross-pieces of the supporting-frame G, and entering diametrical grooves $l'$, formed in the adjacent portions of said bearings, as shown in Figs. 4 and 6.

When it is desired to adjust the upright rollers laterally on the supporting-frame, the respective adjusting-screws are properly turned to cause the screw-nuts to move the rollers in the desired direction, the rollers after adjustment being held in position by the screw-nuts.

Any one of the upright guide-rollers can be readily removed when worn out by causing one of its bearings to move out of line with the other, as shown in Fig. 3, until the roller is tilted sufficiently to permit the withdrawal of its journals from their bearings. This movement of the roller-bearings is effected by turning the two adjusting-screws of the roller in opposite directions, or by allowing one bearing of the roller to remain stationary and moving the other bearing laterally by turning the corresponding adjusting-screw. In order to allow of this tilting movement of the rollers, their pivots are fitted sufficiently loose in their bearings to afford the requisite lateral play.

In replacing a worn-out roller, the journals of the new roller are placed into the bearings in the tilted position shown in Fig. 3, and the bearings are then moved in vertical alinement, whereby the roller is retained in the bearings.

My improvements, while herein shown and described in connection with the tackle of a grain-elevator, may also be used for guiding ropes or cables used in other relations where it is desirable to divert the course of the ropes to avoid obstructions or for other purposes.

I claim as my invention—

1. The combination with a supporting-frame, of a pair of upright guide-rollers each mounted in bearings capable of lateral movement independently of the bearing of the other roller, and an independent adjusting device for each of said rollers, substantially as set forth.

2. The combination with a supporting-frame, of upper and lower sets of adjusting-screws journaled horizontally in said frame, two pairs of bearings having screw-nuts engaging with said upper and lower adjusting-screws, respectively, and a pair of upright guide-rollers each supported in a pair of said upper and lower bearings, whereby the rollers can be adjusted laterally independently of each other, substantially as set forth.

3. The combination with a supporting-frame having transverse guide-rails, of horizontal adjusting-screws journaled on said frame and capable of rotation but held against lengthwise movement, journal-bearings having grooves which engage with said guide-rails and screw-nuts which traverse said adjusting-screws, and guide-rollers journaled in said bearings, substantially as set forth.

4. The combination with a supporting-frame, of two pairs of rotary horizontal adjusting-screws journaled on said frame, the screws of each pair being arranged one above the other, a pair of upright guide-rollers, and bearings for such rollers having screw-nuts which engage with said adjusting-screws, the screw-nuts of one roller engaging with the lower adjusting-screws of both pairs, and the screw-nuts of the other roller engaging with the upper screws of both pairs, substantially as set forth.

Witness my hand this 14th day of September, 1894.

CARLTON T. LADD.

Witnesses:
JNO. J. BONNER,
THEO. L. POPP.